US012670704B2

(12) United States Patent
Zhang et al.

(10) Patent No.: US 12,670,704 B2
(45) Date of Patent: Jun. 30, 2026

(54) METHOD FOR ESTABLISHING 3D MEDICAL IMAGE SEGMENTATION MODEL BASED ON MASKED MODELING AND APPLICATION THEREOF

(71) Applicant: HUAZHONG UNIVERSITY OF SCIENCE AND TECHNOLOGY, Hubei (CN)

(72) Inventors: Xuming Zhang, Hubei (CN); Quan Zhou, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 252 days.

(21) Appl. No.: 18/689,426

(22) PCT Filed: Oct. 17, 2023

(86) PCT No.: PCT/CN2023/124922
§ 371 (c)(1),
(2) Date: Mar. 6, 2024

(87) PCT Pub. No.: WO2024/244261
PCT Pub. Date: Dec. 5, 2024

(65) Prior Publication Data
US 2025/0225776 A1     Jul. 10, 2025

(30) Foreign Application Priority Data

May 29, 2023     (CN) .......................... 202310616934.7

(51) Int. Cl.
G06V 10/778      (2022.01)
G06V 10/26      (2022.01)
(Continued)

(52) U.S. Cl.
CPC .......... G06V 10/7792 (2022.01); G06V 10/26 (2022.01); G06V 10/44 (2022.01);
(Continued)

(58) Field of Classification Search
CPC ....... G06T 7/10; G06T 2200/04; G06V 10/26; G06V 10/44; G06V 10/776; G06V 10/7753; G06V 10/7792; G06V 2201/03
See application file for complete search history.

(56) References Cited

U.S. PATENT DOCUMENTS

2023/0153943 A1      5/2023   Kuen et al.
2023/0359900 A1*   11/2023   Li ......................... G06V 10/759
2023/0410483 A1*   12/2023   Chen ...................... G06N 3/045

FOREIGN PATENT DOCUMENTS

CN          114140390          3/2022
CN          114283329          4/2022

OTHER PUBLICATIONS

Chen, et al. (Masked Image Modeling Advances 3D Medical Image Analysis). (Year: 2022).*
(Continued)

*Primary Examiner* — Daniel G Mariam
(74) *Attorney, Agent, or Firm* — JCIPRNET

(57) ABSTRACT

Disclosed is a method for establishing a 3D medical image segmentation model based on masked modeling and application thereof includes: establishing a semi-supervised learning network, wherein a student network includes an encoding module for extracting latent features and a segmentation decoder that predicts segmentation results, a teacher network includes an encoding module and a segmentation decoder that are structurally consistent with the student network; training the semi-supervised learning network, wherein during training, two random masking operations are performed on each image, and the image is input to the two networks respectively; optimizing and updating
(Continued)

the weight of the student network, and transferring the updated weight to the teacher network, wherein the training loss function includes prototype representation loss, which is used to characterize the difference between the prototypes extracted and generated by the two networks; the student network may further include a reconstruction decoder and an auxiliary segmentation decoder.

20 Claims, 3 Drawing Sheets

(51) Int. Cl.
| | |
|---|---|
| *G06V 10/44* | (2022.01) |
| *G06V 10/774* | (2022.01) |
| *G06V 10/776* | (2022.01) |
| *G06V 20/64* | (2022.01) |

(52) U.S. Cl.
CPC ........ *G06V 10/7753* (2022.01); *G06V 10/776* (2022.01); *G06V 20/64* (2022.01); *G06V 2201/03* (2022.01)

(56) References Cited

OTHER PUBLICATIONS

"International Search Report (Form PCT/ISA/210) of PCT/CN2023/124922", mailed on Jan. 30, 2024, pp. 1-3.
"Written Opinion of the International Searching Authority (Form PCT/ISA/237) of PCT/CN2023/124922", mailed on Jan. 30, 2024, pp. 1-4.
Youngwan Lee et al., "Exploring The Role of Mean Teachers in Self-supervised Masked Auto-Encoders", arXiv:2210.02077 [cs.CV], Oct. 2022, pp. 1-24.

* cited by examiner

METHOD FOR ESTABLISHING 3D MEDICAL IMAGE SEGMENTATION MODEL BASED ON MASKED MODELING AND APPLICATION THEREOF

CROSS-REFERENCE TO RELATED APPLICATION

This application is a 371 of international application of PCT application serial no. PCT/CN2023/124922, filed on Oct. 17, 2023, which claims the priority benefit of China application serial no. 202310616934.7, filed on May 29, 2023. The entirety of each of the above-mentioned patent applications is hereby incorporated by reference herein and made a part of this specification.

FIELD OF THE DISCLOSURE

The present invention belongs to the field of medical image segmentation, and more specifically, relates to a method for establishing a 3D medical image segmentation model based on masked modeling and application thereof.

DESCRIPTION OF RELATED ART

To segment lesions or organs from 3D medical images robustly and accurately is highly significant in such fields as treatment planning and disease diagnosis. Compared with the traditional segmentation algorithms, segmentation approaches based on deep learning models, e.g., convolutional neural network (CNN), have been commonly applied in various visual tasks due to their excellent ability of learning advanced semantic image features. These methods mostly require numerous label data for fully-supervised training. However, the manual annotation is expensive and labor-intensive, which negatively influences the performance of these segmentation approaches. In comparison, the semi-supervised learning (SSL) methods may achieve promising segmented results by absorbing knowledge from both unlabeled and labeled images directly than utilizing labeled data alone.

The SSL typically uses the labeled images for providing the conventional supervised losses such as dice and cross entropy (CE) based losses, and utilizes the unlabeled images for providing such unsupervised losses as consistency regularization and entropy-minimum method. Essentially, the unsupervised losses all serve a common goal of absorbing extra knowledge from unlabeled images by training two learners and maximizing their decision consistency on the same task under some perturbations, e.g., perturbation of image, model, etc. Practically, the SSL segmentation methods involve a dual-model architecture, and make the two models play roles of student and teacher, respectively. The student branch will be trained normally, and its weights at each update are merged into the teacher's via a synchronization mechanism such as the widely-used exponential moving average (EMA) strategy. By doing so, the teacher's predictions are relatively stable and reliable, and thus can be treated as pseudo-labels for the student model, that is, let the student's decision keep consistent with the teacher's if there are no true labels.

Although the SSL methods have gained significant success, their application to 3D medical image segmentation still involves two major challenges. Firstly, the 3D medical data is usually very scarce even for the unlabeled ones, and the segmentation targets with an anatomical prior knowledge may not vary significantly. The methods with slight perturbation will lead to the lack in diversity of the task for the purpose of consistency constraint. Therefore, the student model quickly agrees with the teacher model, and less informative guidance can be gained from consistency constraint. Secondly, due to the weight synchronization, the two models are tightly coupled with each other in terms of knowledge. As training proceeds, this coupling will inevitably become more and more strict, and when the student network learns that there are errors in the knowledge, the teacher network is not able to sense it, and the issue of less effective consistency constraint is exacerbated so that ultimately no informative guidance can be provided for the student. The challenges in the above two aspects lead to the poor robustness and generalization of the 3D medical image segmentation model trained based on the SSL method, and the segmentation accuracy cannot be guaranteed.

SUMMARY OF THE DISCLOSURE

To address deficiencies and make improvement to existing technologies, the present invention provides a method for establishing a 3D medical image segmentation model based on masked modeling and application thereof. The purpose of the invention lies in that, with the use of random masks, the student network and teacher network in the semi-supervised network are able to input different 3D images with some information missing, thereby increasing diversity of the task, so that the two networks can robustly learn related yet complementary features, which, in turn, allows the consistency constraint at the feature level to provide effective unsupervised guidance throughout the training, thus ultimately improving the robustness, generalization and accuracy of 3D medical image segmentation models.

In order to achieve the above purpose, according to one aspect of the present invention, a method for establishing a 3D medical image segmentation model based on masked modeling is provided, which includes:

(S1) Establishing a semi-supervised learning network including a student network and a teacher network;

The student network includes: a first encoding module and a decoding module; the first encoding module includes an encoder for extracting different size features of the 3D input image to obtain latent features; the decoding module includes a first segmentation decoder, and the first segmentation decoder is used for performing feature extraction and up-sampling on latent features to obtain segmentation results.

The teacher network includes: a second encoding module structurally consistent with the first encoding module, and a second segmentation decoder structurally consistent with the first segmentation decoder.

(S2) Using the 3D medical image segmentation dataset including labeled images and unlabeled images to train the semi-supervised learning network. The training method is as follows: fixing the weights of the teacher network, and performing two random masking operations on each image, and the image is input to the student network and teacher network respectively, optimizing and updating the weight of the student network according to the preset training loss function, and transferring the updated weight to the teacher network. The training loss function includes prototype representation loss $L_{p1}$, which is used to characterize the difference between the features in the corresponding area of the segmentation target in latent features $V^s$ and $V^t$ extracted by the student network and the teacher network.

(S3) Extracting the first encoding module and connecting first encoding module to the first decoder to form a 3D medical image segmentation model.

Furthermore, for the student network or teacher network, the feature $p_{fg}$ in the corresponding area of the segmentation target in the latent feature is calculated as follows:

$$p_{fg} = \frac{1}{C} \sum_{j=1}^{C} \mathrm{Up}(V_j) \cdot P_j$$

In the formula, V represents the latent feature, P represents the segmentation result; C represents the number of channels of the latent feature, $V_j$ represents the j-th channel of V, $P_j$ represents the j-th channel of P; and UP( ) represents the up-sampling operation.

Moreover, the expression of prototype representation loss $L_{p1}$ is:

$$L_{pl} = \frac{1}{N+M} \sum_{i=1}^{N+M} L_{mse}\left(p_{fg}^s, p_{fg}^t\right)$$

In the formula, $$p_{fg}^s \text{ and } p_{fg}^t$$

represent the characteristics of the corresponding area of the segmentation target in the latent features $V^s$ and $V^t$ respectively, $L_{mse}$ represents the root mean square error, N and M respectively represent the number of labeled images and unlabeled images in the 3D medical image segmentation dataset.

Further, the training loss function also includes: latent feature loss $L_{fea}$; latent feature loss $L_{fea}$ is used to characterize the difference between the latent features extracted by the student network and the teacher network, and the expression thereof is as follows:

$$L_{fea} = \frac{1}{N+M} \sum_{i=1}^{N+M} L_{mse}(V_i^s, V_i^t)$$

In the formula, $L_{mse}$ represents the root mean square error, N and M respectively represent the number of labeled images and unlabeled images in the 3D medical image segmentation dataset;

$$V_i^s \text{ and } V_i^t$$

respectively represent latent features extracted by student network and teacher network after the i-th image $X_i$ in the 3D medical image segmentation dataset is input.

Furthermore, in the student network, the decoding module also includes K auxiliary segmentation decoders; the auxiliary segmentation decoders are used to extract and up-sample latent features to obtain segmentation results; the up-sampling methods of the K auxiliary segmentation decoders are different from each other, and both are different from the first segmentation decoder.

Moreover, the training loss function also includes: segmentation consistency loss $L_{me}$; the segmentation consistency constraint is used to characterize the difference between the segmentation results of the K auxiliary segmentation decoders and the first segmentation decoder, and the expression thereof is as follows:

$$L_{mc} = \frac{1}{N+M} \sum_{i=1}^{N+M} \sum_{m,n=1 \& m \neq n}^{A} L_{mse}\left(P_{i,m}^s, P_{i,n}^{s\_sharp}\right)$$

In the formula, K is a positive integer, $$A = C_{K+1}^2; P_{i,m}^s \text{ and } P_{i,n}^s$$

represent the segmentation results predicted by the m-th segmentation decoder and the n-th segmentation decoder respectively after the image $X_i$ is input.

$$P_{i,n}^{s\_sharp}$$

represents the result after sharpening $$P_{i,n}^s;$$

the segmentation decoder is the auxiliary segmentation decoder or the first segmentation decoder.

Further, in the student network, the decoding module also includes: a reconstruction decoder; the reconstruction decoder is used to extract and up-sample latent features to restore the original image information and obtain the reconstructed image.

Moreover, the training loss function also includes: reconstruction loss $L_{sup1}$; the reconstruction loss is used to characterize the difference between the reconstructed image reconstructed by the student network and the original image, and the expression thereof is as follows:

$$\begin{cases} L_{sup1} = \frac{\alpha}{N+M} \sum_{i=1}^{N+M} L_{rec}(Q_i^s, X_i) \\ L_{rec} = \frac{1}{N+M} \sum_{i=1}^{N+M} L_{mse}(Q_i^s, X_i) \end{cases}$$

In the formula, $$Q_i^s$$

represents the reconstructed image reconstructed by the student network after the image $X_i$ is input, and $\alpha$ represents the balance parameter.

Further, in the first encoding module, F Hybridformer modules connected successively are also included following the encoder; in the second encoding module, F Hybridformer modules connected successively are also included following the encoder.

The Hybridformer module is used to calculate self-attention in pixel space and a sample dimension.

Moreover, the latent feature extracted by the student network is the feature image extracted by the encoder in the first encoding module and processed by F HybridFormer modules, and the latent feature extracted by the teacher network is the feature image extracted by the encoder in the second encoding module and processed by F HybridFormer modules.

In the formula, F is a positive integer.

Furthermore, the training loss function also includes: a segmentation loss $L_{sup2}$, which is used to characterize the difference between the segmentation result predicted by the first segmentation decoder and the gold standard, and the expression thereof is as follows:

$$L_{sup2} = \frac{1}{N}\sum_{i=1}^{N}L_{seg}(P_i^s, Y_i)$$

In the formula, N represents the number of labeled images in the 3D medical image segmentation dataset, $Y_i$ represents the gold standard of the segmented image corresponding to the i-th image $X_i$ in the 3D medical image segmentation dataset, $$P_i^s$$

represents the segmentation result predicted by the first segmentation decoder after the image $X_i$ is input; and $L_{seg}$ represents the sum of DICE loss and cross-entropy loss.

Further, random masking operation includes:

Dividing the 3D medical images into non-overlapping cubes of equal size, randomly selecting a proportion of cubs, and setting the pixels in the corresponding area to zero.

According to another aspect of the present invention, a 3D medical image segmentation method is provided, including:

The 3D medical image to be segmented is input into the 3D medical image segmentation model established by the method for establishing a 3D medical image segmentation model based on masked modeling, and the segmentation result is obtained from the output of the 3D medical image segmentation model.

According to another aspect of the present invention, a computer-readable storage medium is provided, including a stored computer program. When the computer program is executed by a processor, the device where the computer-readable storage medium is located is controlled to execute the method for establishing a 3D medical image segmentation model based on masked modeling, and/or the 3D medical image segmentation method provided by the present invention.

DESCRIPTION OF EMBODIMENTS

Figure 1:
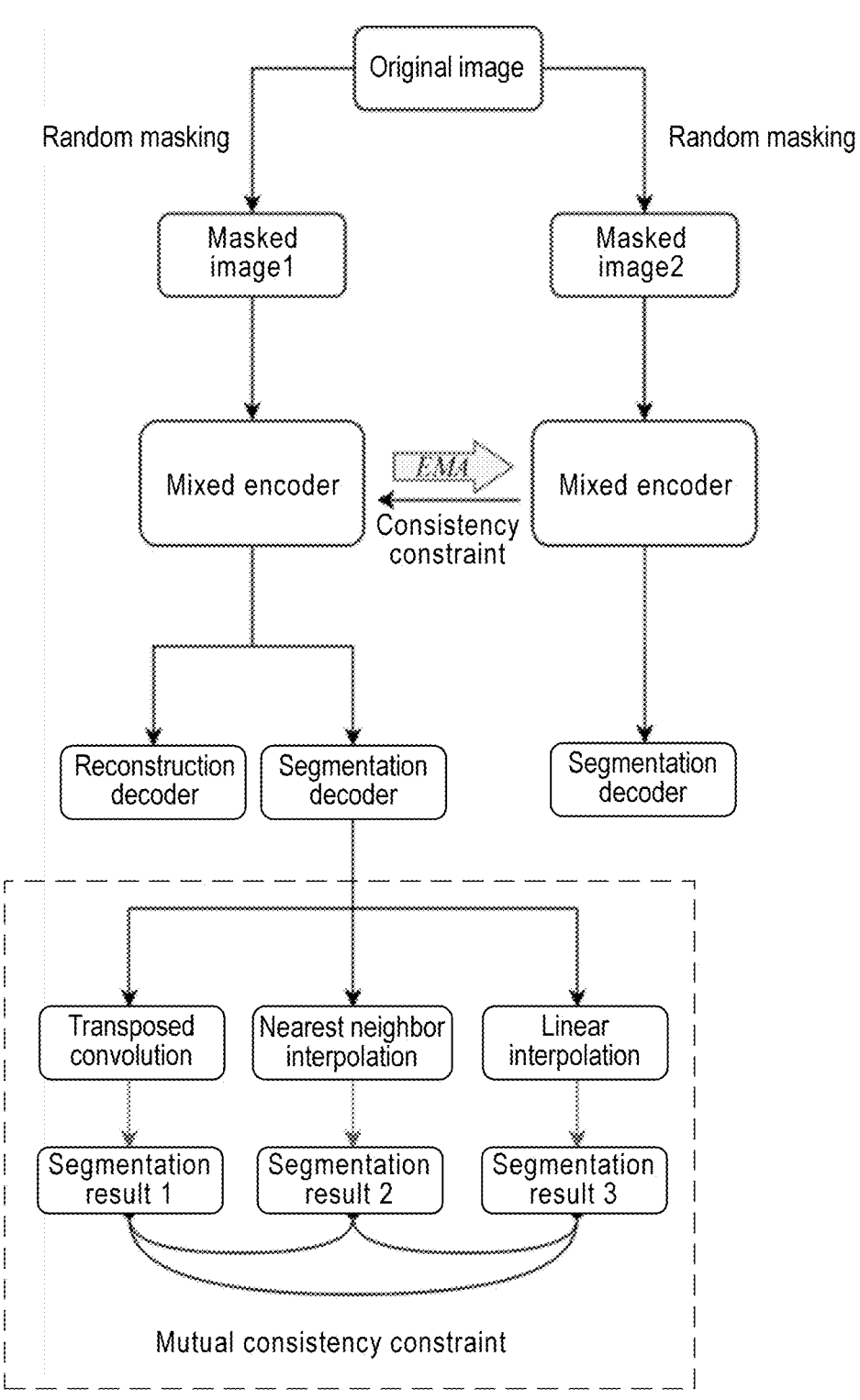
FIG. 1 is a schematic framework diagram of a semi-supervised learning model provided by an embodiment of the present invention.

In order to make the purpose, technical solutions and advantages of the present invention more clearly, the present invention will be further described in detail below with reference to the accompanying drawings and embodiments. It should be understood that the specific embodiments described here are only used to explain the present invention and are not intended to limit the present invention. In addition, the technical features involved in the various embodiments of the present invention described below may be combined with each other as long as they do not conflict with each other.

In the present invention, the terms "first", "second", etc. (if present) in the present invention and the accompanying drawings are used to distinguish similar objects and are not necessarily used to describe a specific order or sequence.

Due to sparse sample size, there are problems of poor robustness, poor generalization and low segmentation accuracy when applying existing SSL method adopting a dual-model architecture to 3D medical image segmentation. In view of the above technical problem, the present invention provides a method for establishing a 3D medical image segmentation model based on masked modeling and application thereof. The whole idea is to generate two different masked images by performing random masking operations on the input original images, and input the masked images into the student network and teacher network respectively, so that the input images of the two models are all incomplete, but they jointly contain the overall information. Due to the randomness of the masking strategy, there is also vast diversity in the image segmentation tasks of the two networks, so that the two networks may robustly learn related yet complementary features, which, in turn, allows the consistency constraint at the feature level to provide effective unsupervised guidance throughout the training, thus improving the robustness, generalization and accuracy of segmentation.

Based on the above masking strategy, in order to further improve the performance of 3D medical image segmentation, the invention provides two specially designed learning fashions, namely diverse joint-task learning (DJL) and decoupled inter-student learning (DIL), and instantiated them as an enhanced teacher-student architecture to realize robust semi-supervised 3D medical image segmentation. In various joint task learning, the student network not only completes the 3D image segmentation task, but also completes the task of restoring the original image information. These two tasks will share the same encoder structure and generate different masked images based on the masking strategy. The student and teacher models learn to jointly segment the same targets while restoring different image contents. The joint task also has vast diversity due to the randomness of the masking strategy. To facilitate DJL, the student model in DIL is attached with one or more auxiliary decoding branches for segmentation, which may be viewed as other 'students' via different up-sampling designs. Pair-wise consistency constraints are optimized at the output level, allowing the two branches to learn mutually with the original student model while their own weights remain detached from the teacher-student synchronization. The student, therefore, benefits from more informative unsuper-vised guidance from the extra decoupled knowledge, and it is possible to avoid errors in the knowledge learned from the original branch, which in turn affects the ability of the teacher network to learn the correct knowledge. In this way, it is possible to gain the ability to suspect, monitor and correct the teacher's possible errors.

Examples are provided below.

Example 1

Figure 2:
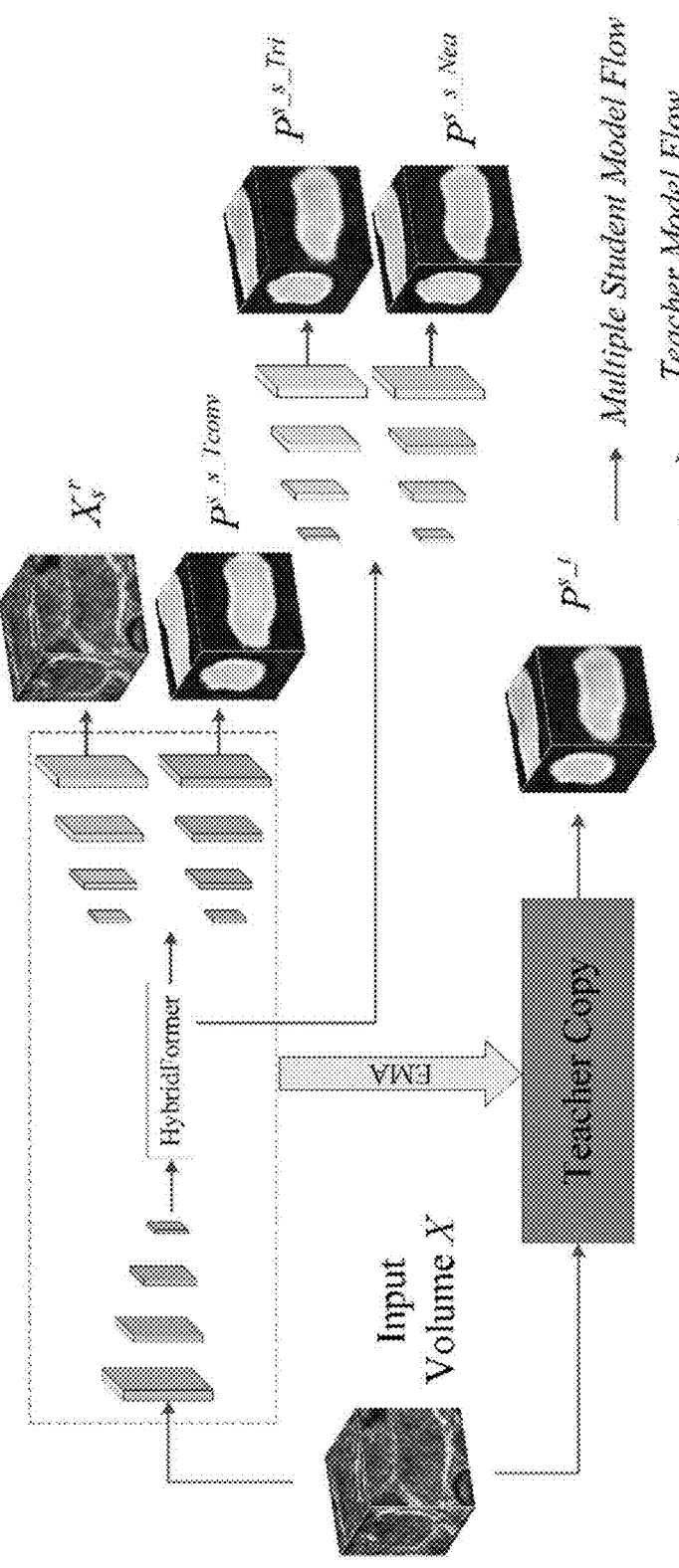
FIG. 2 is a schematic diagram of a method for establishing a 3D medical image segmentation model based on masked modeling provided by an embodiment of the present invention.

A method for establishing a 3D medical image segmen-tation model based on masked modeling, as shown in FIG. 1 and FIG. 2, including:

(S1) Establishing a semi-supervised learning network including a student network and a teacher network, wherein the structure of the semi-supervised learning network is shown in FIG. 1:

Referring to FIG. 1, the student network includes: a first encoding module and a decoding module; the first encoding module includes an encoder, which is used to extract dif-ferent size features of the 3D input image to obtain latent features; the decoding module includes a first segmentation decoder, and the first segmentation decoder is used to extract and up-sample latent features to obtain segmentation results.

Optionally, in this embodiment, the encoder in the student network is composed of multiple convolutional layers and down-sampling layers; the first segmentation decoder is correspondingly composed of multiple convolutional layers and up-sampling layers, and the up-sampling operation is implemented through transposed convolution.

In this embodiment, the input student network and teacher network are images processed through random masking operations, there will be some missing information in the images. In response to this situation, in this embodiment, in the first encoding module, F Hybridformer modules con-nected successively are also included following the encoder, and F is a positive integer; the HybridFormer module is used to calculate self-attention in pixel space and sample dimen-sion. Moreover, the latent features extracted by the student network are the feature images extracted by the encoder in the first encoding module and processed by F HybridFormer modules.

Optionally, in the HybridFormer module, the calculation of self-attention in pixel space and self-attention in sample dimension are completed by two parts, which include multi-layer convolution layers and down-sampling layers respec-tively. In practical applications, the number of F Hybrid-Former modules may be flexibly set according to actual needs.

The latent features output by the first encoding module are input into the first segmentation decoder, and the low-level output feature map and the feature map extracted by the corresponding upper-level large-scale convolution kernel are concatenated along the channel direction through the spanning connection, and 3×3 convolution is adopted to further extracts large-size features, and finally obtains a segmentation prediction map.

Referring to FIG. 1, the teacher network includes: a second encoding module and a second segmentation decoder. The second encoding module is structurally con-sistent with the first encoding module in the student network, including the encoder and F HybridFormer modules follow-ing the encoder, and is used to extract latent features of the input masked image. The second segmentation decoder is structurally consistent with the first segmentation decoder in the student network, and is used to extract and up-sample latent features to obtain segmentation results.

In the student network and teacher network, the introduc-tion of the HybridFormer module effectively improves the feature representation ability in the latent space.

Referring to FIG. 1, in order to implement diverse joint task learning (DJL) to better learn complementary informa-tion in masked image pairs, the decoding module in the student network includes two types of branches, one is the reconstruction decoder and the other one is the segmentation decoder. The reconstruction decoder is used to extract and up-sample latent features to restore the original image information and obtain the reconstructed image; the seg-mentation decoder predicts the segmentation results. In the meantime, in order to reduce the prediction uncertainty in segmentation results, the embodiment specifically includes three segmentation decoders, one of which is the first segmentation decoder, and the other two are auxiliary seg-mentation decoders. These two auxiliary segmentation decoders are also used for performing feature extraction and up-sampling on latent features to obtain segmentation results. However, the up-sampling methods adopted by these two auxiliary segmentation decoders are different from each other and are different from the up-sampling method of the first segmentation decoder, involving linear interpolation and nearest neighbor interpolation respectively. The auxil-iary segmentation decoder cooperates with the first segmen-tation decoder to achieve decoupled inter-student learning (DIL).

It should be noted that the number of auxiliary segmen-tation decoders and the up-sampling method adopted here are only exemplary descriptions and should not be under-stood as the only limitation of the present invention. In practical applications, they may be flexibly adjusted accord-ing to actual needs.

For the established semi-supervised learning model, this embodiment provides a training method for the model accordingly, which is specifically as follows:

(S2) Using the 3D medical image segmentation dataset including labeled images and unlabeled images to train the semi-supervised learning network.

The training method is as follows: fixing the weights of the teacher network, and performing two random masking operations on each image, and the image is input to the student network and teacher network respectively, optimiz-ing and updating the weight of the student network accord-ing to the preset training loss function, and transferring the updated weight to the teacher network. Optionally, in this embodiment, the student network is transferred to the teacher network, which is specifically accomplished through exponential moving average (EMA).

In this embodiment, $X_i \in \mathbb{I}^{H \times W \times D}$ and $Y_i \in \{0,1\}^{H \times W \times D}$ are adopted to represent the input image and segmentation labels, wherein H, W and D represent the height, width and depth of the 3D image. The labeled dataset and the unlabeled dataset are expressed as $Da_L = \{X_i, Y_i | i=1, \ldots N\}$ and $Da_U = \{X_i | i=N+1, \ldots N+M\}$ respectively, wherein N and M represent the number of labeled images and unlabeled images respectively. $P(Y_{pred}|X;\vartheta)$ is a probability map of the input image, and is used to represent the probability that each pixel belongs to various segmentation targets.

Optionally, in this embodiment, specific methods of masking 3D images include the following:

The 3D medical image is divided into, for example, 4×4×4 non-overlapping cubes with equal size, and then a proportion of cubes are randomly sampled from even distribution for masking, and the pixels in the covered area are set to 0. Through the masking operation, the two masked images input to the student network and the teacher network have some information missing. Due to the randomness of the random masking operation, the masked areas of the two masked images are different, and features will be corrupted by random masks in the latent space, which is crucial for medical image segmentation tasks. In the meantime, the two masked images jointly contain complete image information.

Based on the semi-supervised learning network established in step (S1), the masked image input to the student network is processed by its encoding module to obtain the latent feature $V^s$, and then the first segmentation decoder predicts the segmentation result $P^{s\_s\_Tconv}$. Meanwhile, the segmentation results $P^{s\_s\_Tri}$ and $P^{s\_s\_Nea}$ are obtained through two auxiliary segmentation decoders. After the original image information is restored by the reconstruction decoder, the reconstructed image $$X_s^r$$

is obtained. After the masked image input to the teacher network is processed by its encoding module, the latent feature $V^t$ is obtained, and then the segmentation result $P^{s\_t}$ is obtained through predicting performed by the first segmentation decoder.

In the existing dual-model architecture, pixel space information is only extracted by enforcing the probability map of the student network and the probability map of the teacher network, while ignoring the constraints of the latent feature space and the mining of information in unlabeled data. Although consistency learning plays a very important role in semi-supervised segmentation tasks, the masking operation adopted in this embodiment reduces redundant information and creates a more challenging feature representation task than noise or transformation. The same image with different random masks may lead to different predictions, especially when the target area to be segmented is masked. Directly aligning the prediction results of the teacher-student network is too strict and may lead to collapse of predictions. Inspired by prototype learning, this embodiment uses the features and prediction maps of the latent space to extract the prototype representation of its foreground to explore the connection between the feature map and the probability map. Correspondingly, in this embodiment, the training loss function includes the prototype representation loss $L_{p1}$, which is used to characterize the difference between the features of the corresponding area of the segmentation target in the latent features $V^s$ and $V^t$ extracted by the student network and the teacher network. The prototype, namely the characteristics of the corresponding area of the segmentation target in the latent features, is specifically determined jointly through the latent features extracted by the encoding module and the segmentation result predicted by the segmentation decoder. Therefore, in this embodiment, the design of the training loss function may be used to constraint the feature space and the prototype to train the established model and obtain better segmentation performance.

In order to extract multi-channel feature information, this embodiment averages the features along the channel dimension when calculating the prototype. Correspondingly, for the student network or teacher network, the features in the corresponding area of the segmentation target in the latent features are calculated as follows:

$$p_{fg} = \frac{1}{C}\sum_{j=1}^{C} Up(V_j) \cdot P_j$$

In the formula, V represents the latent feature, P represents the segmentation result; C represents the number of channels of the latent feature, $V_j$ represents the j-th channel of V, $P_j$ represents the j-th channel of P; UP( ) represents the up-sampling operation; and $P_{fg} \in [0,1]^{H \times W \times D}$ represents the foreground prototype. Based on the generation method of the prototype, the prototype representation loss $L_{p1}$ is expressed as follows:

$$L_{p1} = \frac{1}{N+M}\sum_{i=1}^{N+M} L_{mse}(p_{fg}^s, p_{fg}^t)$$

In the formula, $$p_{fg}^s \text{ and } p_{fg}^t$$

represent the characteristics of the corresponding area of the segmentation target in the latent features $V^s$ and $V^t$ respectively, $L_{mse}$ represents the root mean square error, N and M respectively represent the number of labeled images and unlabeled images in the 3D medical image segmentation dataset.

This embodiment further takes into consideration that the masks of the student network and the teacher network are independent from each other, so the training loss function is further improved to enhance the similarity of the latent features $(V^s, V^t)$ extracted by the two to achieve information complementation. Correspondingly, in this embodiment, the training loss function also includes: latent feature loss $L_{fea}$; latent feature loss $L_{fea}$ is used to characterize the difference between the latent features extracted by the student network and the teacher network, and the expression thereof is as follows:

$$L_{fea} = \frac{1}{N+M}\sum_{i=1}^{N+M} L_{mse}(V_i^s, V_i^t)$$

In the formula, $L_{mse}$ represents the root mean square error, N and M respectively represent the number of labeled images and unlabeled images in the 3D medical image segmentation dataset;

$$V_i^s \text{ and } V_i^t$$

respectively represent latent features extracted by student network and teacher network after the i-th image $X_i$ in the 3D medical image segmentation dataset is input.

In order to effectively avoid the impact of prediction uncertainty on the robustness, generalization and accuracy of the network, in this embodiment, based on the introduction of the auxiliary segmentation decoder, the auxiliary segmentation decoder together with the original first segmentation decoder will be enforced to pass consistency constraints in pairs, and the sharpening function is adopted to attenuate the influence of pixels that are easily misclassified. For any segmentation decoder, $$P_i^s$$

is adopted to represent the segmentation result predicted thereby after the i-th image $X_i$ is input, and the prediction result after processing by the sharpening function is expressed as follows:

$$P_i^{s\_sharp} = \frac{(P_i^s)^{1/T}}{(P_i^s)^{1/T} + (1 - P_i^s)^{1/T}}$$

In the formula, T represents the hyperparameter used to control the degree of sharpening;

$$P_i^{s\_sharp}$$

is the result processed by the sharpening function, and is used as a pseudo label in the consistency constraint between segmentation decoders, thus enabling the segmentation results predicted by the decoder to be close to the results after sharpening.

In this embodiment, the consistency constraint between segmentation decoders is characterized by the segmentation consistency loss $L_{mc}$. Correspondingly, the training loss function also includes: segmentation consistency loss $L_{mc}$: the segmentation consistency constraint is used to characterize the difference between the segmentation results of the two auxiliary segmentation decoders and the first segmentation decoder, and is expressed as follows:

$$L_{mc} = \frac{1}{N+M} \sum_{i=1}^{N+M} \sum_{m,n=1 \& m \neq n} L_{mse}\left(P_{i,m}^s, P_{i,n}^{s\_sharp}\right)$$

In the formula, $$P_{i,m}^s \text{ and } P_{i,n}^s$$

respectively represent the segmentation results predicted by the m-th segmentation decoder and the n-th segmentation decoder after the image $X_i$ is input, and $$P_{i,n}^{s\_sharp}$$

represents the result after sharpening processing $$P_{i,n}^s;$$

the segmentation decoder is the auxiliary segmentation decoder or the first segmentation decoder. In this embodiment, by introducing a segmentation consistency constraint into the training loss function, the segmentation results of each segmentation decoder may be constrained to be consistent.

Since this embodiment implements joint task learning, the joint task includes not only the segmentation task, but also the reconstruction task, and the two tasks share the same encoding structure. When the information of masked image is accurate, the original and uncorrupted voxel information may be reconstructed through the reconstruction task, so that the encoder extracts features more effectively. In order to ensure the accuracy of the reconstruction task, in this embodiment, the training loss function also includes: reconstruction loss $L_{sup1}$; the reconstruction loss is used to characterize the difference between the reconstructed image reconstructed by the student network and the original image, and is expressed as follows:

$$\begin{cases} L_{sup1} = \dfrac{\alpha}{N+M} \sum_{i=1}^{N+M} L_{rec}(Q_i^s, X_i) \\ L_{rec} = \dfrac{1}{N+M} \sum_{i=1}^{N+M} L_{mse}(Q_i^s, X_i) \end{cases}$$

In the formula, $$Q_i^s$$

represents the reconstructed image reconstructed by the student network after the image $X_i$ is input, and $\alpha$ represents the balance parameter.

In the meantime, in order to ensure the accuracy of the segmentation task, in this embodiment, the training loss function also includes: segmentation loss $L_{sup2}$, which is used to characterize the difference between the segmentation result predicted by the first segmentation decoder and the gold standard, and is expressed as follows:

$$L_{sup2} = \frac{1}{N} \sum_{i=1}^{N} L_{seg}(P_i^s, Y_i)$$

In the formula, N represents the number of labeled images in the 3D medical image segmentation dataset, $Y_i$ represents the gold standard for the segmented image corresponding to the i-th image $X_i$ in the 3D medical image segmentation dataset, $$P_i^s$$

represents the segmentation result predicted by the first segmentation decoder after the image $X_i$ is input; and $L_{seg}$ represents the sum of DICE loss and cross-entropy loss.

Based on the above analysis, in this embodiment, the overall training loss function may be expressed as follows:

$$L_{total} = L_{p1} + L_{fea} + L_{mc} + L_{sup1} + L_{sup2}.$$

On basis of random masking and based on the above semi-supervised learning network structure and the corresponding training loss function, a student network with excellent segmentation performance may be obtained in the embodiment.

On basis of the above steps (S1) and (S2), this embodiment also includes: (S3) extracting the first encoding module and connecting the first encoding module to the first decoder to form a 3D medical image segmentation model.

In general, this embodiment ensures task diversity through random masking strategies. On basis of the above, through various joint task learning (DJL) and decoupled inter-student learning (DIL), the student network and teacher network in the semi-supervised learning network may robustly learn related yet complementary features, which, in turn, allows the consistency constraint at the feature level to provide effective unsupervised guidance throughout the training, and also allows the student network to receive decoupled knowledge so as to obtain more informative unsupervised guidance, and provides the teacher network with abilities to perform error suspicion monitoring and correction, thus ultimately improving the robustness, generalization and higher accuracy of 3D medical image segmentation models established by the present embodiment.

Example 2

A 3D medical image segmentation method, including:

The 3D medical image to be segmented is input into the 3D medical image segmentation model established by the method for establishing a 3D medical image segmentation model based on masked modeling provided in the above-mentioned Example 1, and the segmentation result is obtained from the output of the 3D medical image segmentation model.

Since the 3D medical image segmentation model established in Example 1 has better robustness and generalization, as well as higher segmentation accuracy, based on the 3D medical image segmentation model, this embodiment may obtain segmentation results with high accuracy in various 3D medical image segmentation scenarios.

Example 3

A computer-readable storage medium includes a stored computer program. When the computer program is executed by a processor, the device where the computer-readable storage medium is located is controlled to execute the method for establishing a 3D medical image segmentation model based on masked modeling provided in the above-mentioned Example 1, and/or, the 3D medical image segmentation method provided in the above-mentioned Example 2.

The following uses the segmentation results on the 3D GE-MRI dataset from the left atrial segmentation challenge to further verify the advantageous effects of the method provided by the present invention. For the left atrial dataset, it is obtained using the clinical whole-body MRI scanner and the resolution of the data is $0.625 \times 0.625 \times 0.625$ mm$^3$.

Figure 3:
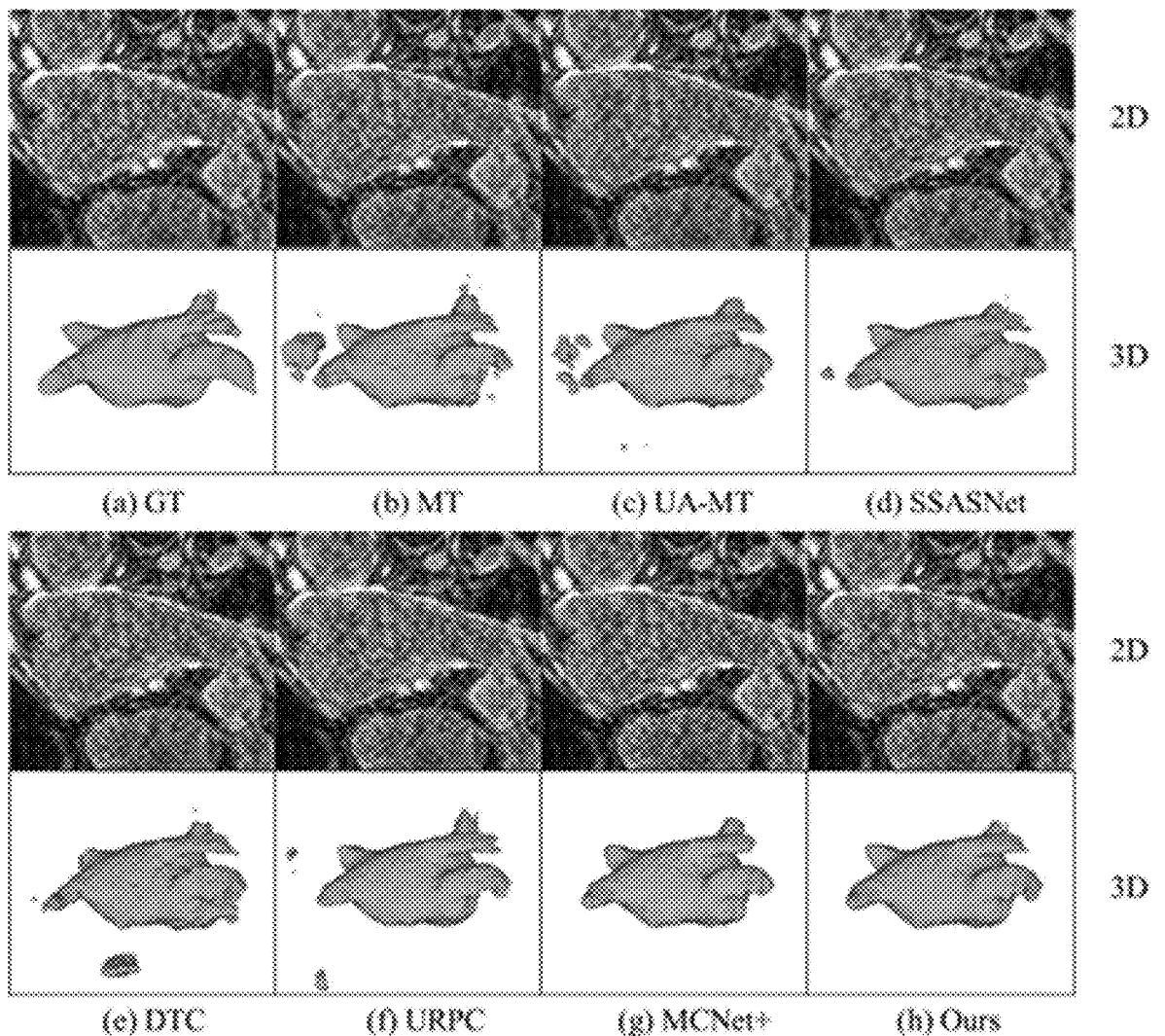
FIG. 3 is a schematic diagram comparing the segmentation results on the same left atrium dataset obtained by the 3D medical image segmentation method provided by an embodiment of the present invention and the existing methods; wherein (a) shows the gold standard for segmentation, (b) shows the segmentation result obtained by the existing MT method, (c) shows the segmentation result obtained by the existing UA-MT method, (d) shows the segmentation result obtained by the existing SSASNet method, (e) shows the segmentation result obtained by the existing DTC method, (f) shows the segmentation result obtained by the existing URPC method, (g) shows the segmentation result obtained by the existing MCNet+ method, and (h) shows the segmentation result obtained by the 3D medical image segmentation method provided by an embodiment of the present invention.

Totally, 154 scans have expert annotations, among which 123 scans and 31 scans are randomly selected to train and test our method, respectively. Before model training, we implement the pre-processing on all the scans by normalizing pixel intensities to unit variance and zero mean, and randomly cropping the samples to $112 \times 112 \times 80$ mm$^3$. For this dataset, the image segmentation visualization results of the 3D medical image segmentation method provided by the present invention and other existing segmentation methods on the left atrium dataset are shown in FIG. 3. In FIG. 3, (a) is the gold standard for segmentation, (b) to (g) are the segmentation results of the existing MT, UA-MT, SSASNet, DTC, URPC, and MCNet+ methods respectively, and (h) is the segmentation results of the 3D medical image segmentation method provided in the embodiment of the present invention. Table 1 lists segmentation quantitative results using 10% and 20% labeled data. Dice, Jaccard similarity coefficient (Jaccard), 95% Hausdorff distance (95HD) and average surface distance (ASD) are used as the evaluation metrics. The greater Dice and Jaccard value, the better the network performance; the smaller 95HD and ASD values, the better the network performance. In Table 1, "Ours" represents the segmentation method provided by the present invention.

As shown in Table 1, the segmentation results with supervised V-Net with 10% and 20% annotations will serve as the baselines. It is shown in Table 1 that all semi-supervised approaches may provide more productive guidance on segmented results than the supervised baselines with 10% annotations, which reveals the usefulness of diverse and substantial information contained in the unlabeled data for model training. In particular, as shown in FIG. 3, supervised V-Net with 100% labeled data outperforms all semi-supervised methods. Although the supervised V-Net with 100% labeled data surpasses the compared semisupervised approaches, there only exists the slight difference between it and our method. Besides, the above quantitative results comprehensively demonstrate that our approach may yield the substantial segmentation performance improvements over other semi-supervised methods.

Specifically, the mainstream semi-supervised methods achieved greater improvements than the corresponding supervised training V-Net on both 20% and 10% labeled data. In particular, the method of the present invention outperforms the compared methods in four quantitative metrics. Among the compared methods, MC-Net+ performs slightly worse than the method of the present invention. Segmentation results for all semi-supervised methods improve as labeled data increases. With extremely limited labeled data, compared with other state-of-the-art semi-supervised algorithms, the method of the present invention may still provide significantly improved segmentation metrics. In order to visually reveal the advantage of the method of the present invention, FIG. 3 visually shows the 2D and 3D views of segmented results generated by all evaluated methods under 10% and 20% labeled data setting. Clearly, the method of the present invention preserves more fine details and sharpens most isolated areas. Although the method of the present invention does not achieve the optimal results in terms of number of parameters and calculations, the difference from other evaluated algorithms is not significant, so the method of the present invention will not bring too much computational burden in view of the powerful computing power of modern computers.

Generally speaking, through the above technical solutions conceived by the present invention, the following advantageous effects may be achieved:

(1) When training the 3D medical image segmentation model, the present invention performs a random masking operation on the input original image to generate two different 3D masked images, and the student network and the teacher network are input respectively, so that the input images of the two models are incomplete, but they all contain complementary and global information. Due to the randomness of the masking strategy, there is also vast diversity in the image segmentation tasks of the two networks, so that the two networks may robustly learn related yet complementary features, which, in turn, allows the consistency constraint at the feature level to provide effective unsupervised guidance throughout the training, thus improving the robustness, generalization and segmentation accuracy. In the meantime, the training loss function includes the prototype representation loss Lp1, which may constrain the feature space and prototype representation to obtain better segmentation performance.

(2) In the preferred solution of the present invention, the features of the latent space (that is, the latent features extracted by the encoding module) and the prediction map output by the segmentation decoder are used to extract the prototype representation of the foreground, which may effectively explore the connection between the feature map and the probability map, thereby improving the training effect of the model.

(3) In the preferred solution of the present invention, a latency feature loss used to characterize the difference between the latency features extracted by the student network and the teacher network is also designed in the training loss function. The introduction of the loss may enhance the similarity between the latent features extracted by the student network and the teacher netmentation decoders learn from each other. Since the up-sampling methods adopted by the auxiliary segmentation decoders are different from each other and different from the original first segmentation decoder, the mutual learning between the students is a type of decoupled learning between students, which enables the first segmentation decoder to receive additional decoupled knowledge to obtain more informative unsupervised guidance, providing the teacher model with error suspicion monitoring and correction capabilities, so that it is possible to effectively avoid the influence caused by prediction uncertainty on the robustness, generalization and accuracy of networks.

(5) In the preferred solution of the present invention, a reconstruction decoder for restoring the original image information is also introduced into the student network, so that the student network completes the segmentation task and the reconstruction task simultaneously, thereby realizing a joint learning task. In the meantime, the reconstruction loss is introduced into the training loss function accordingly. Since the two tasks in the joint learning task share the same encoder structure, the introduction of the reconstruction decoder and reconstruction loss will cause the encoder structure to accurately extract latent features even when part of the image information is missing, thus ensuring the prediction accuracy of the segmentation decoder.

(6) In the preferred solution of the present invention, in the encoding module of the student network and the teacher network, one or more HybridFormer modules are introduced following the encoder to calculate self-attention in the pixel space and sample dimension, thereby further improving the feature representation ability in the latent space.

TABLE 1

QUANTITATIVE COMPARISONS OF ALL EVALUATED APPROACHES
ON THE LEFT ATRIUM SEGMENTATION TASK

| Methods | Scans used | | Metrics | | | | Complexity | |
| | Labeled | Unlabeled | Dice(%) ↑ | Jaccard(%) ↑ | 95HD(voxel) ↓ | ASD(voxel) ↓ | Para(M) ↓ | MACs(G) ↓ |
|---|---|---|---|---|---|---|---|---|
| V-Net | 25 | 0 | 88.98 | 80.25 | 13.87 | 3.39 | 9.18 | 46.85 |
| MT(2017) | 25(20%) | 98(80%) | 90.17 | 82.18 | 9.52 | 2.48 | 9.18 | 46.85 |
| UA-MT(2019) | 25(20%) | 98(80%) | 90.67 | 82.99 | 7.86 | 2.35 | 9.18 | 46.85 |
| SASSNet(2020) | 25(20%) | 98(80%) | 90.57 | 82.83 | 7.27 | 2.24 | 9.44 | 46.88 |
| DTC(2021) | 25(20%) | 98(80%) | 90.64 | 82.93 | 9.39 | 2.65 | 9.44 | 46.88 |
| URPC(2021) | 25(20%) | 98(80%) | 90.33 | 82.36 | 9.70 | 1.66 | 5.85 | 69.36 |
| MC-Net + (2022) | 25(20%) | 98(80%) | 91.19 | 83.86 | 6.18 | 1.48 | 9.44 | 46.88 |
| Ours | 25(20%) | 98(80%) | 91.92 | 85.10 | 5.19 | 1.43 | 11.52 | 47.37 |
| V-Net | 12 | 0 | 87.07 | 77.27 | 15.13 | 4.29 | 9.18 | 46.85 |
| MT(2017) | 12(10%) | 111(90%) | 88.58 | 79.63 | 11.47 | 2.71 | 9.18 | 46.85 |
| UA-MT(2019) | 12(10%) | 111(90%) | 89.38 | 80.92 | 12.36 | 3.56 | 9.18 | 46.85 |
| SASSNet(2020) | 12(10%) | 111(90%) | 89.60 | 81.25 | 7.89 | 2.24 | 9.44 | 46.88 |
| DTC(2021) | 12(10%) | 111(90%) | 90.09 | 82.03 | 8.36 | 1.86 | 9.44 | 46.88 |
| URPC(2021) | 12(10%) | 111(90%) | 89.72 | 82.06 | 7.07 | 2.47 | 5.85 | 69.36 |
| MC-Net + (2022) | 12(10%) | 111(90%) | 90.60 | 82.89 | 9.05 | 2.42 | 9.44 | 46.88 |
| Ours | 12(10%) | 111(90%) | 91.02 | 83.57 | 6.31 | 1.44 | 11.52 | 47.37 | work. In this way, when the inputs of the two networks adopt independent masks, information complementation may be effectively achieved.

(4) In the preferred solution of the present invention, an auxiliary segmentation decoder is also introduced into the student network, and consistency constraints are set between the auxiliary segmentation decoder and the original first segmentation decoder, so that these seg- It is easy for those skilled in the art to understand that the above descriptions are only preferred embodiments of the present invention and are not intended to limit the present invention. Any modifications, equivalent substitutions, improvements, etc. made within the spirit and principles of the present invention should all be included in the protection scope of the present invention.

17

18

What is claimed is:

1. A method for establishing a 3D medical image segmentation model based on masked modeling, comprising:

(S1) establishing a semi-supervised learning network comprising a student network and a teacher network; wherein the student network comprises: a first encoding module and a decoding module; the first encoding module comprises an encoder for extracting different size features of a 3D input image to obtain a latent feature; the decoding module comprises a first segmentation decoder, and the first segmentation decoder is disposed for performing feature extraction and up-sampling on the latent feature to obtain segmentation results;

the teacher network comprising: a second encoding module structurally consistent with the first encoding module, and a second segmentation decoder structurally consistent with the first segmentation decoder;

(S2) using a 3D medical image segmentation dataset comprising labeled images and unlabeled images to train the semi-supervised learning network, wherein the training method is as follows: fixing weights of the teacher network, and performing two random masking operations on each of the images, and the image is input to the student network and teacher network respectively, optimizing and updating a weight of the student network according to a preset training loss function, and transferring the updated weight to the teacher network; the training loss function comprises a proto-type representation loss $L_{p1}$, which is disposed to characterize a difference between features in a corresponding area of a segmentation target in the latent features $V^s$ and $V^t$ extracted by the student network and the teacher network;

(S3) extracting the first encoding module and connecting the first encoding module to a first decoder to form the 3D medical image segmentation model.

2. The method for establishing the 3D medical image segmentation model based on masked modeling according to claim 1, wherein for the student network or teacher network, a feature $p_{fg}$ in the corresponding area of the segmentation target in the latent feature is calculated as follows:

$$p_{fg} = \frac{1}{C}\sum_{j=1}^{C} Up(V_j)\cdot P_j$$

wherein V represents the latent feature, P represents the segmentation result; C represents a number of channels of the latent feature, $V_j$ represents a j-th channel of V, $P_j$ represents a j-th channel of P; and UP( ) represents an up-sampling operation; and an expression of the prototype representation loss $L_{p1}$ is as follows:

$$L_{p1} = \frac{1}{N+M}\sum_{i=1}^{N+M} L_{mse}\left(p_{fg}^s, p_{fg}^t\right)$$

wherein $$p_{fg}^s \text{ and } p_{fg}^t$$

represent characteristics of the corresponding area of the segmentation target in the latent features $V^s$ and $V^t$ respectively, $L_{mse}$ represents a root mean square error, N and M respectively represent a number of the labeled images and the unlabeled images in the 3D medical image segmentation dataset.

3. A 3D medical image segmentation method, comprising:

a 3D medical image to be segmented being input into the 3D medical image segmentation model established by the method for establishing the 3D medical image segmentation model based on masked modeling according to claim 2, and a segmentation result is obtained from an output of the 3D medical image segmentation model.

4. A non-transitory computer-readable storage medium, comprising a stored computer program, wherein when the computer program is executed by a processor, a device where the computer-readable storage medium is located is controlled to execute the method for establishing the 3D medical image segmentation model based on masked modeling according to claim 2.

5. The method for establishing the 3D medical image segmentation model based on masked modeling according to claim 1, wherein the training loss function further comprises: a latent feature loss $L_{fea}$; the latent feature loss $L_{fea}$ is disposed to characterize a difference between the latent features extracted by the student network and the teacher network, and is expressed as follows:

$$L_{fea} = \frac{1}{N+M}\sum_{i=1}^{N+M} L_{mse}(V_i^s, V_i^t)$$

wherein $L_{mse}$ represents a root mean square error, N and M respectively represent a number of the labeled images and the unlabeled images in the 3D medical image segmentation dataset;

$$V_i^s \text{ and } V_i^t$$

respectively represent the latent features extracted by the student network and the teacher network after an i-th image $X_i$ in the 3D medical image segmentation dataset is input.

6. The method for establishing the 3D medical image segmentation model based on masked modeling according to claim 5, wherein in the student network, the decoding module further comprises K auxiliary segmentation decoders; the auxiliary segmentation decoder is disposed to extract and up-sample the latent features to obtain the segmentation results; the up-sampling methods of the K auxiliary segmentation decoders are different from each other, and are different from that of the first segmentation decoder; and the training loss function further comprises: a segmentation consistency loss $L_{mc}$; a segmentation consistency constraint is disposed to characterize a difference between segmentation results of the K auxiliary segmentation decoders and the first segmentation decoder, and is expressed as follows:

$$L_{mc} = \frac{1}{N+M}\sum_{i=1}^{N+M}\sum_{m,n=1\&m\neq n} L_{mse}\left(P_{i,m}^s, P_{i,n}^{s\_sharp}\right)$$

wherein K is a positive integer, $$A = C_{K+1}^2; P_{i,m}^s \text{ and } P_{i,n}^s$$

represent segmentation results predicted by an m-th segmentation decoder and an n-th segmentation decoder represents a result after sharpening respectively after the image $X_i$ is input, $$P_{i,n}^{s\_sharp}$$

represents a result after sharpening $$P_{i,n}^s;$$

the segmentation decoder is an auxiliary segmentation decoder or the first segmentation decoder.

7. The method for establishing the 3D medical image segmentation model based on masked modeling according to claim 6, wherein in the student network, the decoding module further comprises: a reconstruction decoder; wherein the reconstruction decoder is disposed to extract and up-sample the latent features to restore an original image information and obtain a reconstructed image;

the training loss function further comprises: a reconstruction loss $L_{sup1}$; the reconstruction loss is disposed to characterize a difference between the reconstructed image reconstructed by the student network and the original image, and is expressed as follows:

$$\begin{cases} L_{sup1} = \dfrac{\alpha}{N+M} \displaystyle\sum_{i=1}^{N+M} L_{rec}(Q_i^s, X_i) \\ L_{rec} = \dfrac{1}{N+M} \displaystyle\sum_{i=1}^{N+M} L_{mse}(Q_i^s, X_i) \end{cases}$$

wherein $$Q_i^s$$

represents the reconstructed image reconstructed by the student network after the image $X_i$ is input, and $\alpha$ represents a balance parameter.

8. The method for establishing the 3D medical image segmentation model based on masked modeling according to claim 7, wherein in the first encoding module, F Hybridformer modules connected successively are also comprised following the encoder; in the second encoding module, F Hybridformer modules connected successively are also comprised following the encoder;

the Hybridformer module is disposed to calculate self-attention in a pixel space and a sample dimension; and the latent feature extracted by the student network is a feature image extracted by the encoder in the first encoding module and processed by the F HybridFormer modules, and the latent feature extracted by the teacher network is a feature image extracted by the encoder in the second encoding module and processed by the F HybridFormer modules;

wherein F is a positive integer.

9. A 3D medical image segmentation method, comprising: a 3D medical image to be segmented being input into the 3D medical image segmentation model established by the method for establishing the 3D medical image segmentation model based on masked modeling according to claim 5, and a segmentation result is obtained from an output of the 3D medical image segmentation model.

10. A non-transitory computer-readable storage medium, comprising a stored computer program, wherein when the computer program is executed by a processor, a device where the computer-readable storage medium is located is controlled to execute the method for establishing the 3D medical image segmentation model based on masked modeling according to claim 5.

11. A 3D medical image segmentation method, comprising:
a 3D medical image to be segmented being input into the 3D medical image segmentation model established by the method for establishing the 3D medical image segmentation model based on masked modeling according to claim 6, and a segmentation result is obtained from an output of the 3D medical image segmentation model.

12. A 3D medical image segmentation method, comprising:
a 3D medical image to be segmented being input into the 3D medical image segmentation model established by the method for establishing the 3D medical image segmentation model based on masked modeling according to claim 7, and a segmentation result is obtained from an output of the 3D medical image segmentation model.

13. A 3D medical image segmentation method, comprising:
a 3D medical image to be segmented being input into the 3D medical image segmentation model established by the method for establishing the 3D medical image segmentation model based on masked modeling according to claim 8, and a segmentation result is obtained from an output of the 3D medical image segmentation model.

14. The method for establishing the 3D medical image segmentation model based on masked modeling according to claim 1, wherein the training loss function further comprises: a segmentation loss $L_{sup2}$, which is disposed to characterize a difference between a segmentation result predicted by the first segmentation decoder and a gold standard, and is expressed as follows:

$$L_{sup2} = \frac{1}{N} \sum_{i=1}^{N} L_{seg}(P_i^s, Y_i)$$

wherein N represents a number of the labeled images in the 3D medical image segmentation dataset, $Y_i$ represents a gold standard for a segmented image corresponding to the i-th image $X_i$ in the 3D medical image segmentation dataset, $$P_i^s$$

represents the segmentation result predicted by the first segmentation decoder after the image $X_i$ is input; and $L_{seg}$ represents a sum of a DICE loss and a cross-entropy loss.

15. A 3D medical image segmentation method, comprising:

a 3D medical image to be segmented being input into the 3D medical image segmentation model established by the method for establishing the 3D medical image segmentation model based on masked modeling according to claim 14, and a segmentation result is obtained from an output of the 3D medical image segmentation model.

16. The method for establishing the 3D medical image segmentation model based on masked modeling according to claim 1, wherein the random masking operation comprises:

dividing the 3D medical images into non-overlapping cubes of equal size, randomly selecting a proportion of cubs, and setting pixels in the corresponding area to zero.

17. A 3D medical image segmentation method, comprising:

a 3D medical image to be segmented being input into the 3D medical image segmentation model established by the method for establishing the 3D medical image segmentation model based on masked modeling according to claim 16, and a segmentation result is obtained from an output of the 3D medical image segmentation model.

18. A 3D medical image segmentation method, comprising:

a 3D medical image to be segmented being input into the 3D medical image segmentation model established by the method for establishing the 3D medical image segmentation model based on masked modeling according to claim 1, and a segmentation result is obtained from an output of the 3D medical image segmentation model.

19. A non-transitory computer-readable storage medium, comprising a stored computer program, wherein when the computer program is executed by a processor, a device where the computer-readable storage medium is located is controlled to execute the 3D medical image segmentation method according to claim 18.

20. A non-transitory computer-readable storage medium, comprising a stored computer program, wherein when the computer program is executed by a processor, a device where the computer-readable storage medium is located is controlled to execute the method for establishing the 3D medical image segmentation model based on masked modeling according to claim 1.

* * * * *